United States Patent
Sakai et al.

(10) Patent No.: US 6,876,415 B2
(45) Date of Patent: Apr. 5, 2005

(54) DISPLAY APPARATUS

(75) Inventors: Akira Sakai, Kyoto (JP); Motohiro Yamahara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/694,008

(22) Filed: Oct. 28, 2003

(65) Prior Publication Data

US 2004/0085501 A1 May 6, 2004

(30) Foreign Application Priority Data

Oct. 28, 2002 (JP) .................................... 2002-312339

(51) Int. Cl.$^7$ ................................................ G02F 1/13
(52) U.S. Cl. ...................................................... 349/117
(58) Field of Search ................................ 349/117–121

(56) References Cited

U.S. PATENT DOCUMENTS

| | | | |
|---|---|---|---|
| 5,583,679 A | | 12/1996 | Ito et al. |
| 6,236,439 B1 | * | 5/2001 | Saiki et al. .................. 349/117 |
| 6,517,914 B1 | * | 2/2003 | Hiraishi ....................... 428/1.1 |
| 2002/0089620 A1 | * | 7/2002 | Yamamoto et al. ........... 349/96 |
| 2002/0140881 A1 | * | 10/2002 | Nakanishi et al. ............ 349/86 |
| 2003/0117707 A1 | * | 6/2003 | Uchida et al. ............... 359/492 |

FOREIGN PATENT DOCUMENTS

| | | |
|---|---|---|
| JP | 08050206 A | 2/1996 |
| JP | 2002-156527 | 5/2002 |

* cited by examiner

*Primary Examiner*—James A. Dudek
(74) *Attorney, Agent, or Firm*—Nixon & Vanderhye P.C.

(57) ABSTRACT

In the display apparatus of the present invention, an anisotropic scattering film having scattering anisotropy is placed covering the display plane so that the relationship between a standardized input signal and standardized output luminance at any view angle is averaged within a predetermined view angle range.

15 Claims, 5 Drawing Sheets

Input signal (video signal)

Input signal (video signal)

DISPLAY APPARATUS

BACKGROUND OF THE INVENTION

The present invention relates to a display apparatus.

Some display apparatuses have view angle dependence in display performance. Liquid crystal display (LCD) apparatuses represented by a twisted nematic (TN) LCD apparatus are known as typical examples of such display apparatuses. The view angle dependence (or viewing angle characteristic) of display performance as used herein refers to the phenomenon that the display performance such as the contrast ratio, the gray scale characteristic and the hue is different between when the display is viewed from the front (in the direction normal to the display plane of the display apparatus) and when it is viewed in an oblique direction. In general, the display performance is lower when the display is viewed in an oblique direction than when it is viewed from the front.

As far as the LCD apparatus is concerned, the view angle dependence of display performance occurs because of use of liquid crystal molecules having refractive index anisotropy and members such as polarizing plates. This is therefore a problem related to the nature of the LCD apparatus. Conventionally, various methods have been proposed and developed to solve the problem of the view angle dependence. These methods include: a halftone gray scale method in which one pixel is divided into a plurality of regions and voltages different at a fixed ratio are applied to these regions; a domain division method in which one pixel is divided into a plurality of domains having liquid crystal molecules rising in different directions; an in-plane switching (IPS) method in which a transverse electric field is applied to liquid crystal molecules; a multi-domain vertical alignment (MVA) method in which vertically-aligned liquid crystal molecules are driven; and an optically compensated birefringence (OCB) method in which a bend-aligned cell and an optical compensation film are combined. In these methods, however, the structures of alignment films, electrodes and the like must be changed. For this change, it is necessary to establish a fabrication technology and provide a new fabrication facility, and this causes difficulty in fabrication and cost increase.

There is known a method permitting improvement of the problem of the view angle dependence without the necessity of changing the structures of an alignment film, electrodes and the like at all, in which an optical compensation film is incorporated in a conventional TN mode LCD apparatus. For example, JP 8-50206A proposes a method using an optical compensation film including discotic liquid crystal molecules. In a normally-while TN mode LCD apparatus, liquid crystal molecules are mostly aligned vertically with respect to electrode substrates during application of a voltage. Near the substrates, however, the liquid crystal molecules are aligned in parallel with the substrates due to a strong anchoring effect of the substrates. Therefore, the directors of the liquid crystal molecules are not uniform but gradually change in the thickness direction, forming a hybrid structure. In view of this fact, based on the idea of canceling the refractive index anisotropy of the aligned state of the liquid crystal molecules in the liquid crystal cell observed during voltage application, a total of two optical compensation films including a hybrid-aligned discotic liquid crystal material are interposed between a liquid crystal panel and polarizing plates placed on both surfaces of the liquid crystal panel, to thereby improve the view angle dependence.

Other methods based on combinations of various modes and various optical compensation films have also been proposed and developed for solving the problem of the view angle dependence of display performance. These methods have their own effects and can improve the problem of the view angle dependence of display performance to some extent. However, the effects of these methods have only been verified by a measurement scheme in which the expanse of a view angle range within which the contrast ratio is greater than a predetermined value is measured as the viewing angle, or a measurement scheme in which the expanse of a view angle range within which no gray scale inversion occurs and the contrast ratio is greater than a predetermined value is measured as the viewing angle. To state specifically, in examples in JP 2002-156527A, change of the luminance of each of gray scale levels L1 to L8 with change of the view angle is examined, in which L1 denotes the black display state, L8 denotes the white display state and L2 to L7 denote intervening halftone display states roughly equally spaced between the black and white display states. The view angle range within which the contrast ratio represented by the ratio of L8 to L1 is 10 or more and no gray scale inversion is observed between L1 and L2 is determined as the viewing angle for the four directions, upward, downward, leftward and rightward directions. The effect of improving the problem of the view angle dependence is verified by examining whether or not the determined viewing angle is wider than a comparative example.

In other words, in the measurement scheme described above, only the level of the contrast ratio and the presence/absence of gray scale inversion are considered as to the viewability in an oblique direction. No consideration is made at all on the influence of the view angle dependence of the gray scale characteristic on the display performance. The gray scale characteristic as used herein refers to the relationship between an input signal and its output luminance of a display apparatus, which is generally called a γ characteristic. The γ characteristic is an important characteristic in attaining reproduced output luminance proportional to the luminance of an object, and is especially related to the naturalness of display. If this characteristic is poor, so-called white saturation and black saturation occur in a bright portion and a dark portion. Therefore, in the scheme described in JP 2002-156527A, in which a view angle range within which no gray scale inversion is observed between L1 and L2 and the contrast ratio is 10 or more is measured and determined as the viewing angle for the four directions, upward, downward, leftward and rightward directions, if the γ characteristic obtained when the display is viewed at a certain view angle is greatly different from that obtained when it is viewed from the front, the display will be unnatural and the viewability will be low even when the view angle is within the view angle range described above.

SUMMARY OF THE INVENTION

An object of the present invention is providing a display apparatus with enhanced viewability in which natural gray scale reproduction is attained when the display apparatus is viewed in an oblique direction as is obtained when it is viewed from the front.

In a display apparatus, when a standardized input signal is x, standardized output luminance observed from the front is g(x), and standardized output luminance observed in a predetermined oblique direction is g'(x), if g(x) and g'(x) do not correspond with each other, the γ characteristic of the display apparatus, that is, the relationship between the standardized input signal and the standardized output luminance obtained in the predetermined oblique direction is different from that obtained from the front. That is, this display apparatus has view angle dependence. In view of this, according to the present invention, a view angle dependence correction means is provided, in which the deviation of g'(x) from g(x) is expressed as an indicator, and the relationship between the standardized input signal and the standardized output luminance is averaged so that the indicator is low at an arbitrary view angle falling within a predetermined view angle range, to thereby correct the view angle dependence. By providing this means, it is possible to attain high viewability in which natural gray scale reproduction is obtained when the display apparatus is viewed in an oblique direction as is obtained when it is viewed from the front.

The display apparatus of the present invention includes view angle dependence correction means for correcting view angle dependence of the relationship between a standardized input signal and standardized output luminance so that S defined by a relational expression:

$$S = \int_0^{x_{max}} |g(x) - g'(x)| dx \quad (x_{max}: \text{maximum of } x)$$

$(x_{max}:$ maximum of x)
where x is the standardized input signal, g(x) is standardized output luminance observed from the front, and g'(x) is standardized output luminance observed in a predetermined oblique direction is smaller than a fixed value S0 at an arbitrary view angle falling within a predetermined view angle range.

The value S represented by the above relational expression is an indicator of the deviation of g'(x) from g(x). The relationship between the standardized input signal and the standardized output luminance refers to the γ characteristic described above. The view angle dependence of this relationship refers to change of the γ characteristic with the view angle.

According to a survey conducted, the view angle range within which good viewability is essentially required for TVs that are often viewed by a plurality of viewers at a time with some viewing distance includes: a view angle range in which the tilt angle from the normal to the display plane is −40° to 40° in the direction of the azimuthal angle of 90°; a view angle range in which the tilt angle is −60° to 60° in the direction of the azimuthal angle of 180°; and a view angle range in which the tilt angle is −30° to 30° in the directions of the azimuthal angles of 45° and 135°.

Therefore, according to the present invention, the view angle dependence correction means preferably corrects the view angle dependence of the relationship between the standardized input signal and the standardized output luminance so that S is smaller than the value S0 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

According to a survey conducted, when the maximum of each of x, g(x) and g'(x) is standardized to 1, degradation in viewability in an oblique direction compared with that from the front is not obtrusive if S is less than 0.15, but is obtrusive if S is equal to or more than 0.15.

Therefore, according to the present invention, the value S0 is preferably 0.15 when the maximum of each of the values x, g(x) and g'(x) is standardized to 1.

The view angle dependence correction means is not specifically limited, but it is convenient if an anisotropic scatting film having scattering anisotropy is placed to cover the display plane.

Therefore, according to the present invention, the view angle dependence correction means may be essentially composed of an anisotropic scattering film having scattering anisotropy formed covering the display plane. A component having anisotropy may be contained in the anisotropic scattering film to provide the scattering anisotropy.

A preferred embodiment of the present invention is a display apparatus having view angle dependence of the relationship between a standardized input signal and standardized output luminance corrected so that S defined by a relational expression:

$$S = \int_0^1 |g(x) - g'(x)| dx$$

where x is an input signal standardized to have a maximum of 1, g(x) is output luminance standardized to have a maximum of 1 observed from the front, and g'(x) is output luminance standardized to have a maximum of 1 observed in a predetermined oblique direction is smaller than 0.15 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

The view angle dependence correction means is not specifically limited, but it is convenient if an anisotropic scatting film having scattering anisotropy is placed to cover the display plane.

Therefore, in this embodiment, the view angle dependence of the relationship between the standardized input signal and the standardized output luminance may be corrected by an anisotropic scattering film having scattering anisotropy placed covering the display plane.

A specific embodiment of the present invention is a display apparatus including an anisotropic scattering film having scattering anisotropy placed covering the display plane so that the relationship between a standardized input signal and standardized output luminance at any view angle is averaged within a predetermined view angle range.

BRIEF DESCRIPTION OF THE DRAWINGS

Other and further objects, features and advantages of the invention will be apparent from the following description of an embodiment taken in connection with the accompanying drawings, in which.

DESCRIPTION OF THE PREFERRED EMBODIMENT

Figure 1:
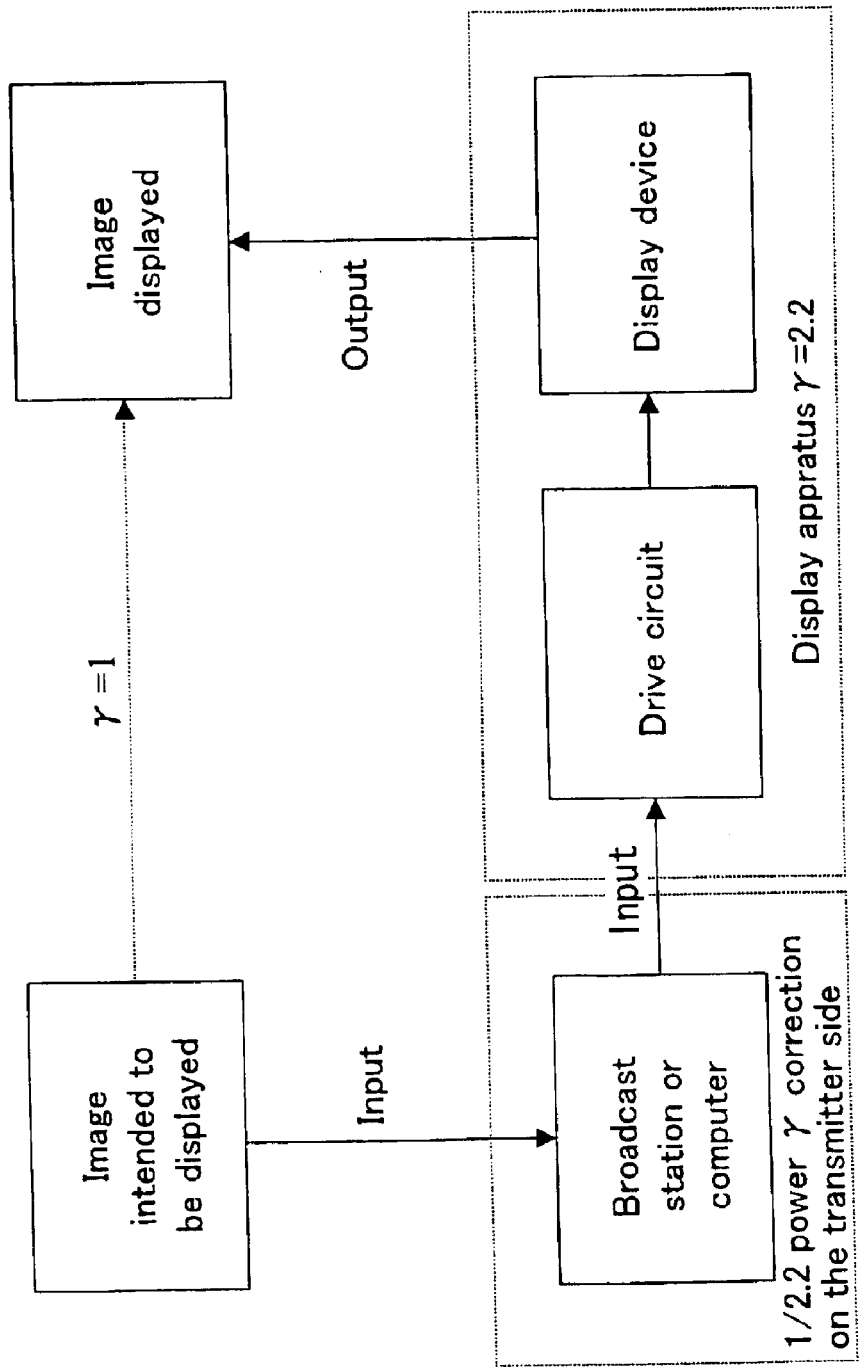
FIG. 1 is a flowchart showing how a video signal γ-corrected on the side of a transmitter is input and then output as output luminance.

Hereinafter, a preferred embodiment of the present invention will be described with reference to the accompanying drawings.

First, the relationship between an input signal and output luminance of a display apparatus will be described. In display apparatuses or display devices, the input signal—output signal relationship is generally called γ characteristic. The display apparatus as used herein is defined as an apparatus essentially composed of a display device and a drive system placed upstream of the display device. The input signal is generally a video signal or an applied voltage, and the output signal is generally output luminance. For example, in many display devices such as a CRT used for a CRT display apparatus and a liquid crystal panel used for an LCD apparatus, output luminance is modulated with an applied voltage. The liquid crystal panel itself only functions as a non-spontaneous light bulb, and therefore it is its transmittance, not output luminance, that essentially changes with an applied voltage. However, if the liquid crystal panel is considered being a device integral with a backlight device, it can be regarded as a device of which output luminance changes with an applied voltage. Hereinafter, for simplification of description, the output signal of any of display devices including a liquid crystal panel is regarded as output luminance.

The display apparatus is an apparatus in which a video signal is input as the input signal, and an appropriate voltage determined by the drive system is applied to the display device, to obtain an output as the output luminance. In general, the relationship between the input signal and the output luminance must be linear to secure linear gray scale characteristic of images. However, the relationship between the applied voltage as the input signal and the output luminance of a general display device, that is, the γ characteristic of the display device is not linear, but has nonlinearity specific to the device. For example, the nonlinearity of CRTs is idealized with the power law of $L \propto V^\gamma$ where L is the output luminance, V is the input signal (applied voltage), and γ is a value called a γ coefficient, which is 2.2 in the case of CRTs.

Due to the device-specific nonlinearity, it is necessary to correct the input signal in advance according to the γ characteristic of the display device so that linear relationship is established between the pre-corrected input signal and the output luminance. This correction is called γ correction. By maintaining γ=1 throughout the system from the input signal to the output luminance, the relationship between the input signal and the output luminance can be made linear.

The γ correction may be performed on the side of the display apparatus, that is, by the drive system. This is however uneconomic because each display apparatus must be provided with a correction circuit. For this reason and also from the standpoint of stability of the properties of the correction circuit, the γ correction is performed on the side of a broadcast station according to the NTSC system, one of the current television system standards, based on the premise that CRTs are used for the display apparatuses. More specifically, correction of (1/2.2) power is performed for a video signal as the input signal before the signal is transmitted.

As for display apparatuses for personal computers, also, it is now a common practice to perform the correction using image display software and LUT of a video card inside a computer. Generally, γ correction based on the premise of using γ=2.2 display apparatuses is performed except for special cases such as simulating a print image.

However, the γ correction described above, which is for CRTs, is inherently unnecessary for LCD apparatuses and the like. Therefore, in LCD apparatuses and the like, the γ correction performed on the side of the transmitter (broadcast station or inside of a computer) is cancelled with inverse γ correction, and further γ correction for linearizing γ characteristic specific to the display device concerned is performed by the drive system. As a result, γ is 2.2 as the entire display apparatus. In this way, together with the (1/2.2) power γ correction performed on the side of the transmitter, γ=1 is attained throughout the system from the input signal to the output luminance. The flowchart in FIG. 1 shows how a video signal γ-corrected on the side of the transmitter is input and then output as the output luminance.

Figure 2:
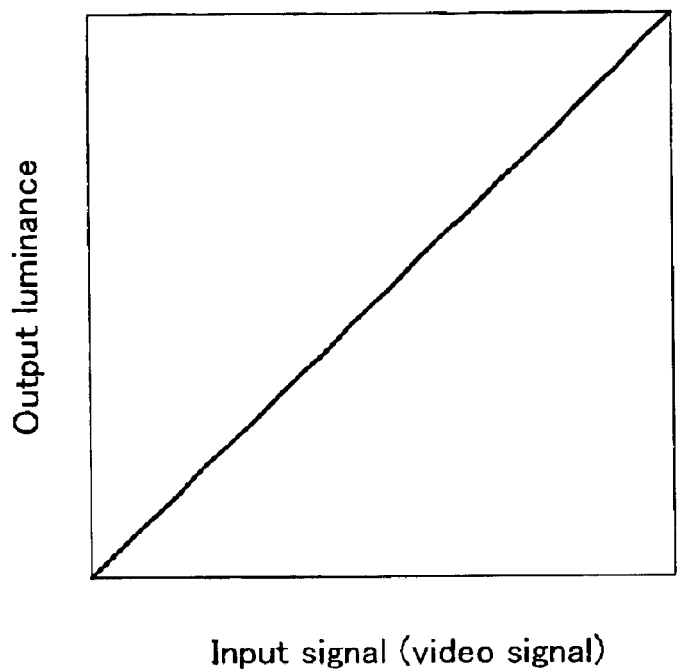
FIG. 2 is a graph showing the relationship between the standardized input signal and the standardized output luminance, which is a linear relationship.

The reason why the γ coefficient of the display apparatus is set at 2.2 is to attain γ=1 throughout the system from the input signal to the output luminance together with the (1/2.2) power γ correction performed on the side of the transmitter, to thereby linearize the relationship between the input signal and the output luminance, as described above. FIG. 2 shows the input signal—output luminance relationship in this case.

Figure 3:
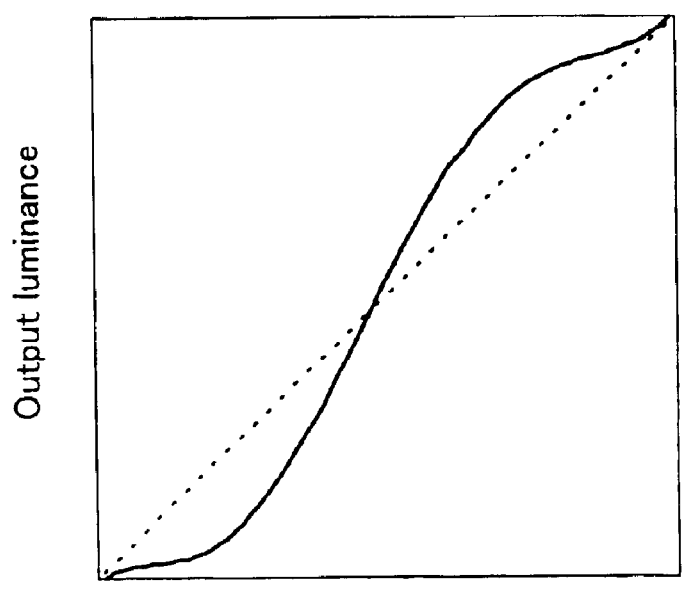
FIG. 3 is a graph showing the relationship between the standardized input signal and the standardized output luminance, which is a roughly S-shaped relationship.

The γ coefficient of a display apparatus is not necessarily 2.2, and the γ characteristic of a display apparatus is not necessarily expressed in the form of the idealized power law of $L \propto V^\gamma$. For example, an appropriate γ characteristic that is not expressed in the form of the power law of $L \propto V^\gamma$ may be imparted to a display apparatus, to give a roughly S-shaped relationship between the input signal and the output luminance as shown in FIG. 3. In this roughly S-shaped input signal—output luminance relationship, in which a gray level close to black is drawn to black and a gray level close to white is drawn to white, the apparent contrast enhances. Therefore, depending on the use and design concept of the display apparatus, the correction circuit may be designed to obtain this γ characteristic. Alternatively, the drive system may be provided with a function of adjusting the γ characteristic depending on the use of the display apparatus.

However, whatever the design value of the γ characteristic is, optimum design of the γ characteristic is conventionally performed only for viewing from the front of the display apparatus. Therefore, for a display apparatus having view angle dependence in display performance, the γ characteristic obtained when viewed in an oblique direction is not necessarily optimized to the design value. If the γ characteristic obtained when viewed in an oblique direction is greatly deviated from that obtained when viewed from the front, the display is unnatural when viewed in the oblique direction, causing degradation in viewability.

Hereinafter, a method for quantifying the deviation of the γ characteristic obtained when viewed in an oblique direction from that obtained when viewed from the front will be described. The γ characteristic represents the relationship between the input signal and the output luminance as described above. The configuration of the input signal is mainly determined by the type of the display and the capability of a data driver of the drive system. A display apparatus mainly meant for image display, such as a display apparatus for a personal computer, generally uses a digital driver for the driver system, to perform display with received digital signals. A display apparatus mainly meant for video display, such as an AV display apparatus, conventionally uses an analog driver for the driver system, to perform display with received analog signals. In recent years, however, with widespread use of digital equipment, even AV display apparatuses often use a digital driver.

In the case of a digital 8-bit data driver, for example, the number of levels of gray of the input signal is 256 from 0 to 255. To generalize the discussion, however, the input signal is standardized so that the maximum is 1. By this standardization, any input signal can be handled as having a minimum of 0 and a maximum of 1 irrespective of the type of the data driver. Like the video signal, the output luminance is also standardized so that the maximum is 1, and therefore can be handled as having a minimum of 0 and a maximum of 1 irrespective of the type of the display apparatus, although this depends on the type of the display apparatus and the like. In the following discussion, the input signal standardized to have a maximum of 1 in the manner described above is denoted by x, and the output luminance standardized to have a maximum of 1 is denoted by y.

When $g(x)$ and $g'(x)$ are functions representing the relationships between y and x viewed from the front and viewed in an oblique direction, respectively, the area of the region surrounded by the curves or straight lines $y=g(x)$, $y=g'(x)$, $x=0$ and $x=1$, defined as S, is represented by the following expression. If a plurality of such surrounded regions exist, S is the sum of the areas of these regions.

$$S = \int_0^1 |g(x) - g'(x)| dx$$

S=0 if the γ characteristic viewed from the front and that viewed in an oblique direction completely match each other. S is greater as the deviation of the γ characteristic from each other is greater. The minimum of S is 0 and the maximum thereof is 1.

As described above, the deviation of the γ characteristic viewed in an oblique direction from that viewed from the front can be quantified by the magnitude of S. Specifically, the deviation is smaller as S is smaller in the range of 0 as the minimum and 1 as the maximum, and is greater as S is greater in this range. If S is below an acceptable limit when viewed in any of all oblique directions within a view angle range in which good viewability is essentially required for a display apparatus, the display apparatus is considered having high viewability with reduced change in gray scale characteristic with change in viewing direction within the view angle range.

(Survey and Experiment)

A survey and experiment conducted for display apparatuses will be described.

<Survey of View Angle Range>

A survey was conducted to determine a view angle range within which good viewability is essentially required for a display apparatus. The survey, conducted for ordinary households, included a questionnaire asking each respondent to presume a room in which the family watched TV most frequently and then locate the position at which a TV set was placed and the position at which the family watched the TV. The reason why the TV set was used as a typical display apparatus is that TV sets, which are often viewed by a plurality of viewers at a time with a longer viewing distance, are evidently wider in the view angle range within which good viewability is essentially required, compared with monitors of computers that are basically used personally and are short in viewing distance.

The details of the survey are as follows. Each respondent was asked to select one corner of a room composed of two walls and a floor as a reference. Having this corner as the origin, the z-axis is given in the direction normal to the floor, and the x-axis and y-axis orthogonal to the z-axis are given in parallel with the respective walls. In the resultant xyz coordinate system, by actually measuring distances with a measure, the position at which the TV set is placed and the position at which the viewer views the TV can be determined as the xyz coordinates. The respondent was asked to give the coordinates of the positions of the upper left, upper right and lower right corners of the TV screen, to determine the location and orientation of the placement of the TV set. The position of the eyes of the viewer was used as the z coordinate of the position of the viewer. The respondent was also asked to provide a plurality of positions of the viewer, classified as a position at which the viewer frequently views (frequently viewed), a position at which the viewer occasionally views (occasionally viewed), and a position at which the viewer seldom views (seldom viewed). In this way, the position of the TV set and the position of the viewer can be expressed as the xyz coordinates, and the orientation of the placement of the TV set can be computed from the xyz coordinates of the corners of the screen. Thus, by conducting appropriate coordinate system rotation and vector operation, the view angle at which the TV set is viewed can be finally computed. The view angle was actually determined from its azimuthal angle and tilt angle. The azimuthal angle is an angle defining the direction in which the view angle tilts from the normal to the screen. The azimuthal angle is defined as 0° when the view angle tilts rightward from the normal, and as 90°, 180° and 270° respectively when the view angle tilts upward, leftward and downward from the normal. Also, the angle tilting toward the middle between the rightward and upward directions is defined as 45°. The tilt angle is an angle defining by which amount the view angle tilts in the direction defined by the azimuthal angle. The tilt angle may be expressed with a sign. For example, the view angle having a tilt angle of 90° in the downward direction may be expressed as having a tilt angle of −90° at an azimuthal angle of 90°.

The computation result of the view angle varies depending on which point on the TV screen the viewer gazes. In this survey, a total of five points, the center and the four corners of the screen, were determined as gaze points. For the gaze of the screen corners, the computation result of only one corner point giving the largest tilt angle was used as a typical computation result.

Figure 4:
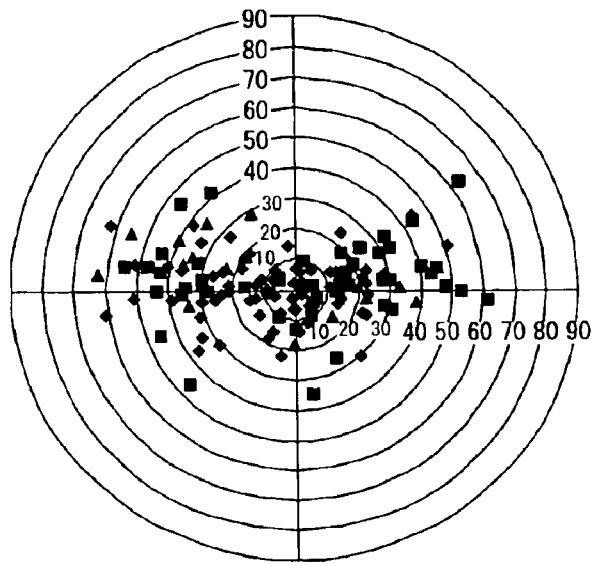
FIG. 4 is a graph showing the distribution of view angles computed for gaze on the center of the screen.
Figure 5:
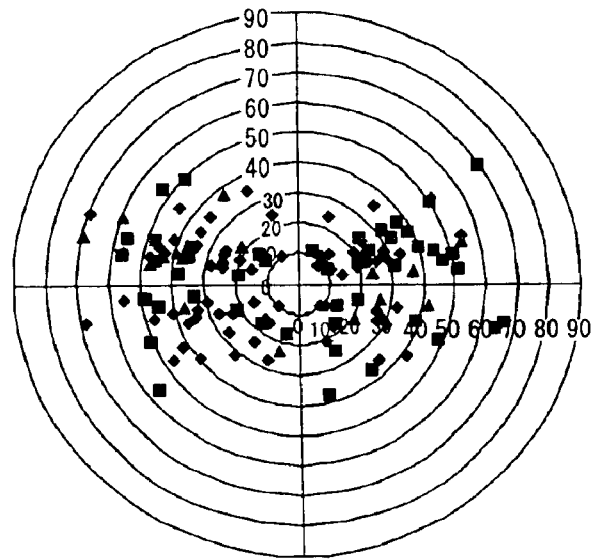
FIG. 5 is a graph showing the distribution of view angles computed for gaze on a corner of the screen.
Figure 6A:
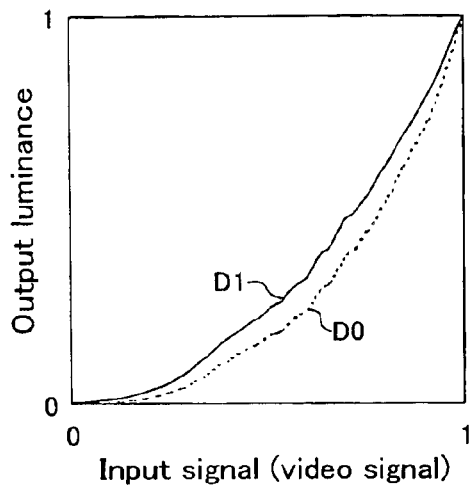
FIGS. 6A to 6E are graphs showing the relationship between the standardized input signal and the standardized output luminance of display apparatuses D1 to D5.
Figure 6B:
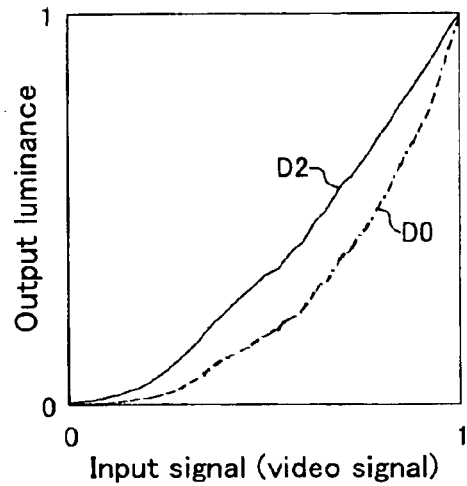
Figure 6C:
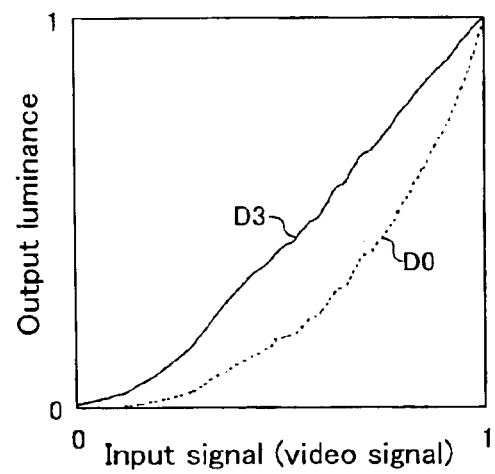
Figure 6D:
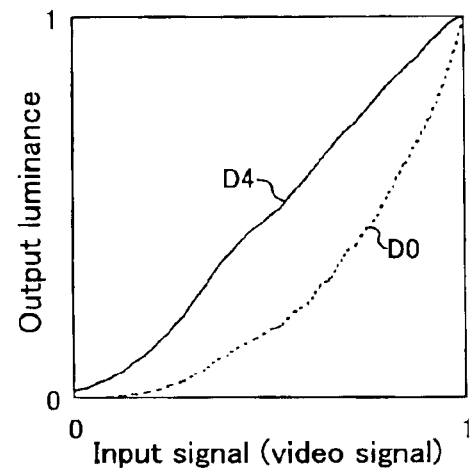
Figure 6E:
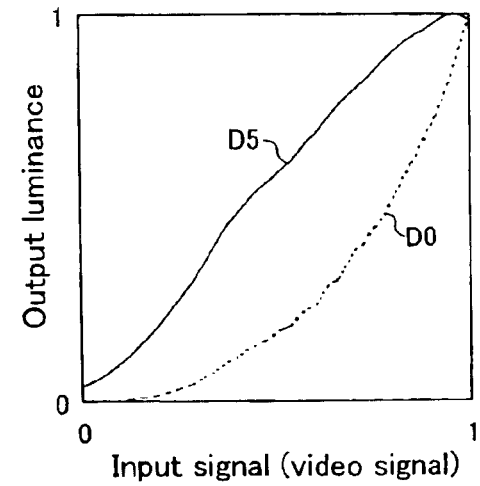

The respondents of this survey were 30 nonspecialists of ages 24 to 55, in which 24 respondents had a CRT as the display apparatus of the TV set, and 6 respondents had an LCD. The screen diagonal size of the display apparatus varied from 8 inches to 33 inches. No significant difference was however recognized in distribution of view angles due to the variations in the type and size of the display apparatus. Therefore, all the computation results were simply aggregated irrespective of the variations in type and size. FIGS. 4 and 5 show the distributions of view angles computed for the gaze on the center of the screen and for the gaze on a corner of the screen, respectively. In FIGS. 4 and 5, each view angle is expressed as two-dimensional polar coordinates using the azimuthal angle and the tilt angle. The intersection point of the two coordinate axes represents the direction of an azimuthal angle of 0° and a tilt angle of 0°, that is, the direction normal to the display plane. Any point on the circle having the smallest radius has a tilt angle of 10°, and any point on the circle having the second smallest radius has a tilt angle of 20°. Such concentric circles are given every 10 degrees until the circle having the largest radius indicating a tilt angle of 90°. As is found from FIGS. 4 and 5, the view angles roughly fall within the range of −40° to 40° at an azimuthal angle of 90°, the range of −60° to 60° at an azimuthal angle of 180° and the range of −30° to 30° at azimuthal angles of 45° and 135°. That is, from the results of the survey described above, it can be determined that the above ranges constitute the view angle range within which good viewability is essentially required for a display apparatus, which is hereinafter called the view angle range A.

<Subjective Evaluation Experiment>

A subjective evaluation experiment using an LCD apparatus was conducted to examine the acceptable limit of the deviation of the γ characteristic. In the subjective evaluation experiment, each subject was asked to observe an LCD screen displaying an image for evaluation from the front, to examine how the viewability of the image changes as the γ characteristic of the LCD apparatus changes from γ=2.2 as the reference value. It is not easy to arbitrarily change the γ characteristic of the LCD apparatus. Therefore, in this experiment, as a quasi method, appropriate γ correction was performed for the image for evaluation using image processing software while the γ characteristic of the LCD apparatus was fixed at γ=2.2, to thereby obtain the same final display as display that would have been obtained by changing the γ characteristic of the LCD apparatus. This method will be described in detail.

First, one image for digital evaluation of which the gray scale—output luminance characteristic has been quantized at γ=1 is prepared as an original image P0. The original image P0 is subjected to γ correction for LCD apparatuses having γ=2.2 with image display software or a video card inside a computer before being transmitted. The γ-corrected image is input into an LCD apparatus having γ=2.2 as the video signal. As a result, the image is displayed on the LCD apparatus with γ=1×(1/2.2)×2.2=1.

Next, the original image P0 is re-quantized with γ=0.5 with image processing software, to obtain an evaluation image P. When the evaluation image P is input into the LCD apparatus having γ=2.2, the image is displayed on the LCD apparatus with γ=0.5×(1/2.2)×2.2 =0.5. This displayed image is equivalent to an image obtained by displaying the original image P0 on an LCD apparatus having γ=1.1. That is, 0.5×(1/2.2)×2.2=1×(1/2.2) ×1.1=0.5. In this way, by changing the γ characteristic of an image, the same final display as display that would have been obtained by changing the γ characteristic of the LCD apparatus can be obtained in a quasi manner.

Adopting the method described above, evaluation images P1 to P5 different in γ characteristic from the original image P0 were prepared. Display of the original image P0 corresponds to display on a display apparatus D0 having γ=2.2. Likewise, displays of the evaluation images P1 to P5 respectively correspond to displays on quasi display apparatuses D1 to D5 having γ≠2.2. The γ characteristics of the quasi display apparatuses D1 to D5 can be computed by inverse operation from the γ characteristics of the evaluation images P1 to P5. The results are shown in FIGS. 6A to 6E, in each of which the γ characteristic of the display apparatus D0 is also shown.

A specific procedure of the subjective evaluation experiment and its results will be described.

A double stimulus continuous quality scale (DSCQS) method was adopted for the subjective evaluation experiment. The DSCQS method is a method in which an evaluation sample and then a reference sample are presented and the evaluator is asked to evaluate the degree of degradation of the evaluation sample with respect to the reference sample according to the following 5-stage degradation scale.

5. No degradation is recognized at all.
4. Degradation is recognized but unobtrusive.
3. Degradation is somewhat obtrusive.
2. Degradation is obtrusive.
1. Degradation is very obtrusive.

Adopting this method to the case described above, the quasi display apparatuses D1 to D5 having γ≠2.2 are evaluated with respect to the display apparatus D0 having γ=2.2 as the reference, and by this evaluation, a change in viewability with change in γ characteristic can be determined. The evaluation was conducted by 30 nonspecialists of ages 24 to 55 as the evaluators. The average evaluation scores of the 30 evaluators are shown in Table 1. As is found from Table 1, the average scores for D1 and D2 of which the deviation S is below 0.15 exceed the border 4 in which degradation is unobtrusive. On the contrary, the average scores for D3 to D5 of which the deviation S is 0.15 or more are below the border 4 indicating that degradation is obtrusive. From the results of the subjective evaluation experiment described above, it is found that the acceptable limit S0 of the deviation S of the γ characteristic, within which the viewability will not be degraded, is 0.15.

TABLE 1

|  | D1 | D2 | D3 | D4 | D5 |
|---|---|---|---|---|---|
| Deviation S | 0.05 | 0.10 | 0.15 | 0.20 | 0.28 |
| Average score | 4.8 | 4.3 | 3.5 | 3.1 | 2.5 |

To state differently, by optimizing the characteristics of the display apparatus so that the deviation S of the γ characteristic is below the acceptable limit S0 in the view angle range A, natural gray scale reproduction can be provided and thus high viewability can be obtained even when viewed in an oblique direction, as obtained when viewed from the front.

(LCD Apparatus)

Figure 7:
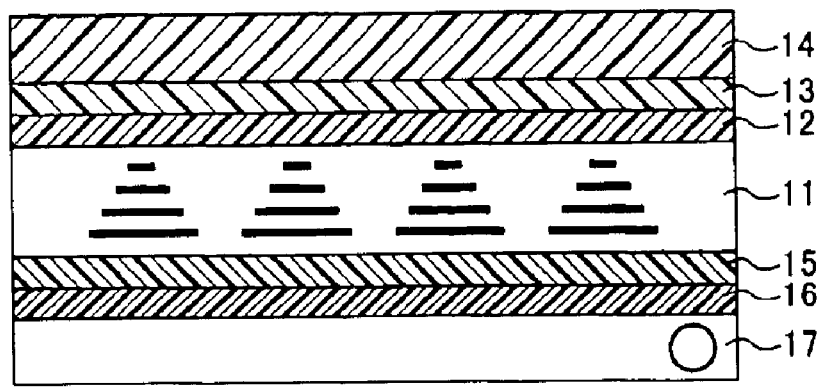
FIG. 7 is a diagrammatic cross-sectional view of an LCD apparatus of an embodiment of the present invention.

FIG. 7 shows a liquid crystal display (LCD) apparatus 10 of an embodiment of the present invention. The LCD apparatus 10 includes a TN mode liquid crystal (LC) panel 11. A viewing side optical compensation film 12, a viewing side polarizing plate 13 and an anisotropic scattering film 14 are formed one upon another in this order on the front surface of the LC panel 11, that is, on the viewing side of the LC panel 11. A non-viewing side optical compensation film 15, a non-viewing side polarizing plate 16 and a backlight unit 17 are formed one upon another in this order on the back surface of the LC panel 11.

The LC panel 11 is essentially composed of an active matrix substrate and a counter substrate opposed to each other with a space therebetween and a liquid crystal layer formed by sealing a nematic liquid crystal material having electrooptic properties in the space between the substrates. The LC panel 11 has a number of pixels in its display part, so that a voltage applied to the liquid crystal layer is controlled for each pixel.

Each of the viewing side and non-viewing side optical compensation films 12 and 15 placed on both sides of the LC panel 11 is composed of a plastic film in which discotic liquid crystal molecules are hybrid-aligned, for example.

Each of the viewing side and non-viewing side polarizing plates 13 and 16 placed on both sides of the LC panel 11 is formed by immersing a plastic film made of polyvinyl alcohol or the like in a solution containing iodine to allow iodine to adsorb to the film, drawing the resultant film, and coating both surfaces of the film with a plastic film made of cellulose triacetate or the like as a protection layer, for example. The two polarizing plates are placed so that the drawing directions, that is, the polarizing axes thereof are orthogonal to each other.

The anisotropic scattering film 14, which is composed of a plastic film having scattering anisotropy, for example, is placed in an adjusted position so as to intensely scatter incident light output from the viewing side polarizing plate 13 in the direction normal to the plate, moderately scatter incident light output from the viewing side polarizing plate 13 in an upward direction, and weakly scatter incident light output from the viewing side polarizing plate 13 in leftward, rightward and downward directions. Note that the downward direction in this case corresponds to the normal viewing direction with respect to the LC panel 11, and the upward direction corresponds to the opposite to the normal viewing direction with respect to the LC panel 11.

The backlight unit 17 is essentially composed of a light source, a reflector, a diffuser plate, a dimmer plate and the like accommodated in a case, and constitutes a sheet light source emitting uniform light to the entire LC panel 11.

In the LCD apparatus 10 having the construction described above, light emitted from the backlight is incident on the non-viewing side polarizing plate 16, which transmits only a linearly-polarized light component having a predetermined direction. The transmitted light enters the LC panel 11 via the non-viewing side optical compensation film 15, and is rotated according to the aligned state of liquid crystal molecules of the liquid crystal layer, or changed to elliptically-polarized light, for each pixel. The resultant light then enters the viewing side polarizing plate 13 via the viewing side optical compensation film 12, to transmit only a linearly-polarized light component having a predetermined direction. The transmitted light is output externally via the anisotropic scattering film 14, to thereby display an image as an aggregate of such pixels.

In the LC panel 11, the applied voltage to the liquid crystal layer is controlled for each pixel, to modulate the aligned state of the liquid crystal molecules and thereby adjust the light transmittance. In other words, the LC panel 11 functions as a light bulb.

The non-viewing side and viewing side optical compensation films 12 and 15 compensate a difference in birefringence between when viewed from the front and when viewed in an oblique direction, to widen the viewing angle of display.

The anisotropic scattering film 14 averages the γ characteristic within the view angle range in which the tilt angle from the normal to the display plane is −40° to 40° at an azimuthal angle of 90°, the view angle range in which the tilt angle is −60° to 60° at an azimuthal angle of 180° and the view angle range in which the tilt angle is −30° to 30° at azimuthal angles of 45° and 135°, that is, within the view angle range A. In other words, the view angle dependence of the relationship between the standardized input signal and the standardized output luminance is corrected so that S defined by the relational expression:

$$S = \int_0^{x_{max}} |g(x) - g'(x)| dx$$

where x is the input signal standardized to have a maximum of 1, g(x) is the output luminance standardized to have a maximum of 1 observed from the front, and g'(x) is the output luminance standardized to have a maximum of 1 observed in a predetermined oblique direction is smaller than the acceptable limit S0 of 0.15 at an arbitrary view angle falling within the view angle range A. If the anisotropic scattering film 14 is not provided, the viewability observed from the front will be best, that observed from above will be worst, and those observed from left, right and below will be intermediate between the best and the worst. This is the reason why the anisotropic scatting film 14 is placed in the adjusted position described above. The good viewability observed from the front is imparted to views in oblique directions by intense scattering, while the poor viewability observed from above is imparted to views in other oblique directions to such a degree that does not largely affect the views by moderate scattering. In this way, the γ characteristic is averaged to attain a balance as a whole.

In the LCD apparatus 10 having the construction described above, in which the anisotropic scattering film 14 having scattering anisotropy is formed covering the display plane, the relationship between the standardized input signal and the standardized output luminance is averaged at any view angle falling within the view angle range in which the tilt angle from the normal to the display plane is −40° to 40° at an azimuthal angle of 90°, the view angle range in which the tilt angle is −60° to 60° at an azimuthal angle of 180° and the view angle range in which the tilt angle is −30° to 30° at azimuthal angles of 45° and 135°, that is, within the view angle range A, in which good viewability is generally required. By this averaging, the indicator S of the deviation between g(x) and g'(x) is kept lower than the acceptable limit S0 of 0.15. Thus, natural gray scale reproduction is obtained even when viewed in an oblique direction as is obtained when viewed from the front, and thus high viewability can be attained.

Next, test evaluations conducted for LCD apparatuses of an example according to the present invention and a comparative example will be described.

(Display Apparatus for Test Evaluation)

EXAMPLE

An LCD apparatus having substantially the same construction as that in the embodiment described above was used as an example according to the present invention. In this example, an optical compensation film including discotic liquid crystal molecules was used. The anisotropic scattering film was placed in an adjusted position so as to intensely scatter incident light output from the viewing side polarizing plate in the direction normal to the plate, moderately scatter incident light output from the viewing side polarizing plate in an upward direction, and weakly scatter incident light output from the viewing side polarizing plate in leftward, rightward and downward directions. The anisotropic scattering film used had a haze measured according to JIS K7105 of 50.0% for light incident in the direction normal to the display plane, 30.0% for light incident in an upward direction at a tilt angle of 40°, and 10.0% for light incident in leftward and rightward directions at a tilt angle of 60° and light incident in a downward direction at a tilt angle of 40°. The downward direction in this case corresponds to the normal viewing direction with respect to the LC panel 11, and the upward direction corresponds to the opposite to the normal viewing direction with respect to the LC panel 11.

Comparative Example

As the comparative example, an LCD apparatus having the same construction as that of the example according to the present invention except that no anisotropic scattering film was formed on the viewing side polarizing plate was used.

(Test Evaluation Method and Results)

Table 2 shows the deviation S of the γ characteristic computed and the result of a subjective evaluation experiment on the viewability, conducted for the LCD apparatus of the example according to the present invention. Table 3 shows the deviation S of the γ characteristic computed and the result of the subjective evaluation experiment on the viewability, conducted for the LCD apparatus of the comparative example. The deviation S of the γ characteristic was computed based on the γ characteristic measured with a view angle measurement apparatus (CV-1000 from Minolta Co., Ltd.) for each of the directions of the azimuthal angles of 90°, 180°, 45° and 135°. The subjective evaluation experiment on the viewability was conducted as follows. A total of 10 nonspecialists as the evaluators performed visual evaluation at free view angles focusing on naturalness of the gray scale characteristic when viewed in an oblique direction. Mark ○ was given as the subjective evaluation when at least 8 out of the 10 evaluators evaluated the characteristic natural within a view angle range sufficiently wide in consideration of the actual use circumstances, and otherwise mark x was given.

It is found from Table 3 that in the comparative example, the deviation S is greater in the direction of the azimuthal angle of 90° than in the other azimuthal angle direction, and the deviation S is greater as the tilt angle is greater in any azimuthal angle direction. The deviation S exceeds the acceptable limit S0 of 0.15 in some directions, and the subjective evaluation result is x.

On the contrary, as is found from Table 2, in the example according to the present invention, S is below the acceptable limit S0 of 0.15 in all the oblique directions and the subjective evaluation result is ○. In this example, the γ characteristic, that is, the view angle dependence of the relationship between the standardized input signal and the standardized output luminance is corrected by the anisotropic scattering film, allowing averaging of the characteristic within the view angle range.

TABLE 2

| Tilt angle (°) | | −60 | −40 | −30 | 30 | 40 | 60 |
|---|---|---|---|---|---|---|---|
| Deviation S | Azimuthal angle 90° | — | 0.12 | 0.11 | 0.12 | 0.14 | — |
| | Azimuthal angle 180° | 0.08 | 0.03 | 0.02 | 0.02 | 0.03 | 0.08 |
| | Azimuthal angle 45° | — | — | 0.09 | 0.09 | — | — |
| | Azimuthal angle 135° | — | — | 0.09 | 0.09 | — | — |
| Subjective evaluation | | | | ○ | | | |

TABLE 3

| Tilt angle (°) | | −60 | −40 | −30 | 30 | 40 | 60 |
|---|---|---|---|---|---|---|---|
| Deviation S | Azimuthal angle 90° | — | 0.15 | 0.15 | 0.16 | 0.21 | — |
| | Azimuthal angle 180° | 0.12 | 0.05 | 0.03 | 0.03 | 0.05 | 0.12 |
| | Azimuthal angle 45° | — | — | 0.11 | 0.12 | — | — |
| | Azimuthal angle 135° | — | — | 0.12 | 0.11 | — | — |
| Subjective evaluation | | | | x | | | |

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A display apparatus comprising:
view angle dependence correction means for correcting view angle dependence of the relationship between a standardized input signal and standardized output luminance so that S defined by a relational expression:

$$S = \int_0^{x_{max}} |g(x) - g'(x)| dx \quad (x_{max}: \text{maximum of } x)$$

where x is the standardized input signal, g(x) is standardized output luminance observed from the front, and g'(x) is standardized output luminance observed in a predetermined oblique direction is smaller than a fixed value S0 at an arbitrary view angle falling within a predetermined view angle range.

2. The apparatus of claim 1, wherein the view angle dependence correction means corrects the view angle dependence of the relationship between the standardized input signal and the standardized output luminance so that S is smaller than the value S0 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

3. The apparatus of claim 1, wherein the value S0 is 0.15 when the maximum of each of the values x, g(x) and g'(x) is standardized to 1.

4. The apparatus of claim 1, wherein the view angle dependence correction means is essentially composed of an anisotropic scattering film having scattering anisotropy formed covering the display plane.

5. The apparatus of claim 1, wherein the display scheme of the display apparatus is a liquid crystal display scheme.

6. A display apparatus having view angle dependence of the relationship between a standardized input signal and standardized output luminance corrected so that S defined by a relational expression:

$$S = \int_0^1 |g(x) - g'(x)| dx$$

where x is an input signal standardized to have a maximum of 1, g(x) is output luminance standardized to have a maximum of 1 observed from the front, and g'(x) is output luminance standardized to have a maximum of 1 observed in a predetermined oblique direction is smaller than 0.15 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

7. The apparatus of claim 6, wherein the view angle dependence of the relationship between the standardized input signal and the standardized output luminance is corrected by an anisotropic scattering film having scattering anisotropy placed covering the display plane.

8. The apparatus of claim 6, wherein the display scheme of the display apparatus is a liquid crystal display scheme.

9. A display apparatus comprising an anisotropic scattering film having scattering anisotropy placed covering the display plane so that the relationship between a standardized input signal and standardized output luminance at any view angle is averaged within a predetermined view angle ranges;

wherein S defined by a relational expression:

$$S = \int_0^1 |g(x) - g'(x)| dx$$

where x is an input signal standardized to have a maximum of 1, g(x) is output luminance standardized to have a maximum of 1 observed from the front, and g'(x) is output luminance standardized to have a maximum of 1 observed in a predetermined oblique direction is smaller than 0.15 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

10. The apparatus of claim 9, wherein the display scheme of the display apparatus is a liquid crystal display scheme.

11. A method of operating a display, the method comprising:

providing a display;

correcting view angle dependence of the relationship between a standardized input signal and standardized output luminance of the display so that S is defined by a relational expression:

$$S = \int_0^{x_{max}} |g(x) - g'(x)| dx \quad (x_{max}: \text{maximum of } x)$$

where x is the standardized input signal, g(x) is standardized output luminance observed from the front, and g'(x) is standardized output luminance observed in a predetermined oblique direction is smaller than a fixed value S0 at an arbitrary view angle falling within a predetermined view angle range.

12. The method of claim 11, further comprising correcting view angle dependence of a relationship between the standardized input signal and the standardized output luminance so that S is smaller than the value S0 at an arbitrary view angle falling at least within a view angle range in which a tilt angle from the normal to the display plane is −40° to 40° at an azimuthal angle of 90°, a view angle range in which the tilt angle is −60° to 60° at an azimuthal angle of 180° and a view angle range in which the tilt angle is −30° to 30° at azimuthal angles of 45° and 135°.

13. The method of claim 11, wherein the value S0 is 0.15 when the maximum of each of the values x, g(x) and g'(x) is standardized to 1.

14. The method of claim 11, wherein the display comprises a view angle dependence correcting structure comprising an anisotropic scattering film having scattering anisotropy formed covering at least part of a display plane.

15. The method of claim 11, wherein the display comprises a liquid crystal display.

* * * * *